US006698670B1

(12) United States Patent
Gosis et al.

(10) Patent No.: US 6,698,670 B1
(45) Date of Patent: Mar. 2, 2004

(54) FRICTION FIT PAINT CUP CONNECTION

(75) Inventors: Anatoly Gosis, Palatine, IL (US); Mark D. Bauer, Mount Prospect, IL (US); Michael Velan, Mount Prospect, IL (US); Mark E. Charpie, Lambertville, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/458,436

(22) Filed: Jun. 10, 2003

(51) Int. Cl.[7] ................................................ A01G 25/14
(52) U.S. Cl. ..................................... 239/376; 222/146.5
(58) Field of Search ................................. 239/345, 346, 239/376, 379, DIG. 14, 302, 320, 323; 222/146.5, 189, 158, 570

(56) References Cited

U.S. PATENT DOCUMENTS

| | | | | | |
|---|---|---|---|---|---|
| 4,524,887 | A | * | 6/1985 | Cocks | 222/146.5 |
| 4,978,072 | A | | 12/1990 | Kurowski | |
| 5,071,413 | A | * | 12/1991 | Utterberg | 604/533 |
| 5,415,352 | A | | 5/1995 | May | |
| 5,655,714 | A | | 8/1997 | Kieffer et al. | |
| 5,803,360 | A | | 9/1998 | Spitznagel | |
| 5,810,258 | A | | 9/1998 | Wu | |
| 5,918,815 | A | | 7/1999 | Wu | |
| 5,984,206 | A | | 11/1999 | Leitzel et al. | |
| 6,012,651 | A | | 1/2000 | Spitznagel | |
| 6,053,429 | A | | 4/2000 | Chang | |
| 6,092,740 | A | | 7/2000 | Liu | |
| 6,206,240 | B1 | * | 3/2001 | Osgar et al. | 222/39 |
| 6,213,410 | B1 | | 4/2001 | Spitznagel | |
| 6,305,585 | B1 | * | 10/2001 | Saint-Ramon et al. | 222/570 |
| 6,450,422 | B1 | | 9/2002 | Maggio | |

* cited by examiner

*Primary Examiner*—Gene Mancene
*Assistant Examiner*—Thach H Bui
(74) *Attorney, Agent, or Firm*—Lisa M. Soltis; Mark W. Croll; Donald J. Breh

(57) ABSTRACT

A cover-connector for covering and connecting a fluid supply container to a conduit is provided, wherein one of the container and the conduit has a male frustoconical connecting surface and the other one of said container and said conduit has a threaded connecting surface. The novel cover-connector comprises a conduit side with a conduit connecting region, a container side with a container connecting region, and a passageway between the connecting regions, wherein one of the connecting regions has a female frustoconical surface having an acute frustoconical angle complementary to the male frustoconical connecting surface for frictional connection therebetween, and wherein the other one of the connecting regions has a threaded portion complementary to the threaded connecting surface for threaded connecting therebetween.

10 Claims, 4 Drawing Sheets

FRICTION FIT PAINT CUP CONNECTION

BACKGROUND OF THE INVENTION

1. Field of the Invention

The present invention is directed to the connection between a fluid supply cup and an adapter for a fluid applicator, more particularly to the connection between a paint cup and an adapter for a paint sprayer.

2. Description of the Related Art

Typically, the connection between a fluid supply and a fluid applicator, such as a paint sprayer for automobile painting and repainting in body shops, is via an adapter between the fluid supply and the sprayer, such as with a threaded connection between a supply cup and the adapter. However, it is difficult to prevent leaking from threading connections without precision machining of the threads or the use of seals, particularly for threaded connections that have short lengths. Also, it is difficult to quickly engage and disengage a threaded supply cup and an adapter.

Attempts have been made to create a connection between a supply cup and an adapter that can be engaged and disengaged quickly and easily. U.S. Published Applications US 2003/0006311 and US 2002/0134861 disclose a connection between the paint cup and the adapter with several parts, including a bayonet type connection. However, the connections in these applications are unnecessarily complex and do not solve the problem of sealing between the supply cup and the adapter.

What is needed is a connection between a fluid supply cup and an adapter that can be engaged and disengaged quickly and easily, and that provides a strong, tight seal around the connection.

BRIEF SUMMARY OF THE INVENTION

In accordance with the present invention, a cover-connector is provided for covering a fluid supply container and connecting the container to a conduit, wherein one of the container and the conduit has a male frustoconical connecting surface and the other one of the container and the conduit has a threaded connecting surface. The novel cover-connector comprises a conduit side with a conduit connecting region, a container side with a container connecting region, and a passageway between the connecting regions, wherein one of the connecting regions has a female frustoconical surface having an acute frustoconical angle complementary to the male frustoconical connecting surface for frictional connection therebetween, and wherein the other one of the connecting regions has a threaded portion complementary to the threaded connecting surface for threaded connecting therebetween.

In one embodiment, a novel cover-connector for covering and connecting a paint container to a male tapered hollow bore adapter for use with a paint sprayer includes a generally frustoconical cover having an axis and extending from a vertex region to an edge at an obtuse frustoconical angle facing toward the paint container when covering the paint container, a container connecting region with threads adjoining the cover edge and extending toward the paint container when covering the paint container, the threads being normal to the axis, a generally frustoconical female fitting integrally connected to the cover at the vertex region, the fitting extending from the cover generally axially opposite from the container connecting region for receiving the male tapered hollow bore adapter, the fitting being angled to open axially and radially outwardly at an acute angle from the axis to a distal fitting end generally defining a plane normal to the axis, the fitting being complementary to the adapter while providing for frictional engagement therebetween, a passageway between the container connecting region and the fitting, and a generally cylindrical support wall extending axially from the cover edge to a distal wall end in the plane, whereupon engagement of the threads with the paint container and the fitting with the adapter provides fluid communication between the paint container and the adapter.

Also in accordance with the present invention, a fluid supply assembly for use with a fluid applicator comprises a fluid container and a conduit, wherein one of the container and the conduit has a male frustoconical connecting surface and the other one of the cover and the conduit has a threaded connecting surface, and a cover-connector for covering the container and connecting the container to the conduit, the cover-connector including a conduit side with a conduit connecting region, a container side with a container connecting region, and a passageway between the connecting regions, wherein one of the connecting regions has a female frustoconical surface having an acute frustoconical angle complementary to the male frustoconical connecting surface for frictional connection therebetween and wherein the other one of the connecting regions has a threaded portion complementary to the threaded connecting surface for threaded connection therebetween.

Also in accordance with the present invention, a novel method of connecting a fluid container to a fluid applicator comprises the steps of providing a conduit in fluid communication with the fluid applicator, providing the container, wherein one of the container and the conduit has a male frustoconical connecting surface and the other one of the container and the conduit has a threaded connecting surface, providing a cover-connector having a conduit side with a conduit connecting region, a container side with a container connecting region, and a passageway between the connecting regions, wherein one of the connecting regions has a female frustoconical surface having an acute frustoconical angle complementary to the male frustoconical connecting surface, and wherein the other of the connecting regions has a threaded portion complementary to the threaded connecting surface, threadingly connecting the threaded portion and the threaded connecting surface, and engaging the male frustoconical connecting surface with the female frustoconical surface and rotating the male frustoconical connecting surface and the female frustoconical surface with respect to one another, for frictional connection therebetween.

These and other objects, features and advantages are evident from the following description of the present invention, with reference to the accompanying drawings.

DETAILED DESCRIPTION OF THE INVENTION

Figure 1:
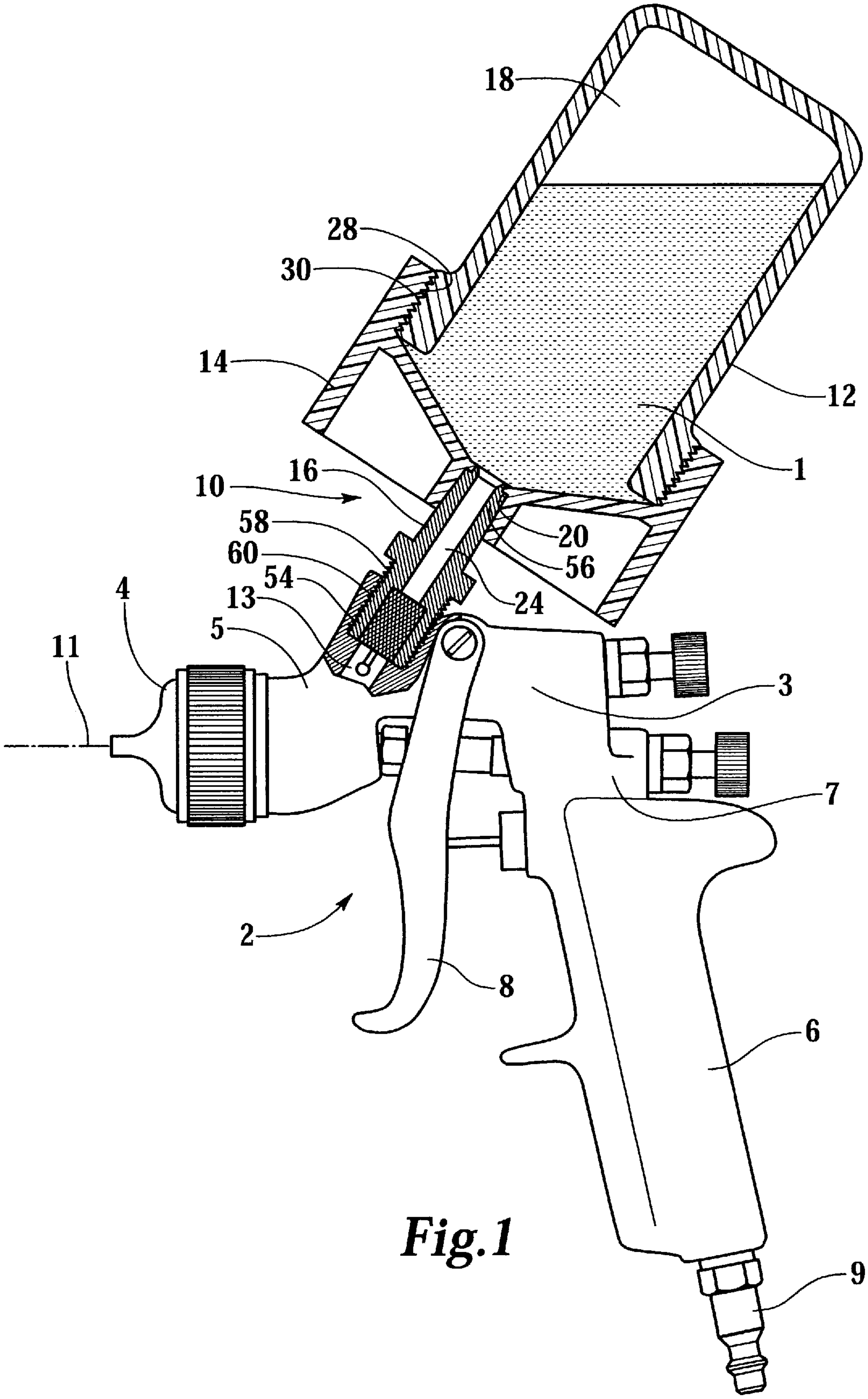
FIG. 1 is a side elevation view of gravity-feed paint sprayer with a novel fluid supply assembly according to the present invention having friction fit tapered surfaces.
Figure 2:
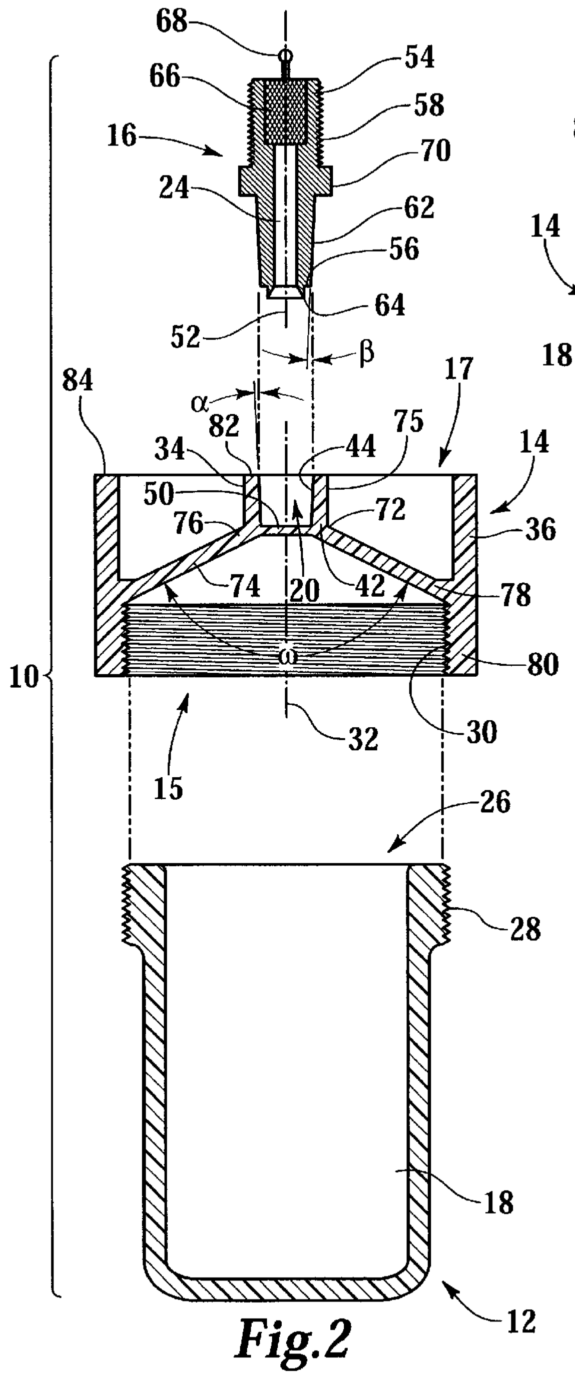
FIG. 2 is an exploded side sectional view of the fluid supply assembly of the present invention.
Figure 5:
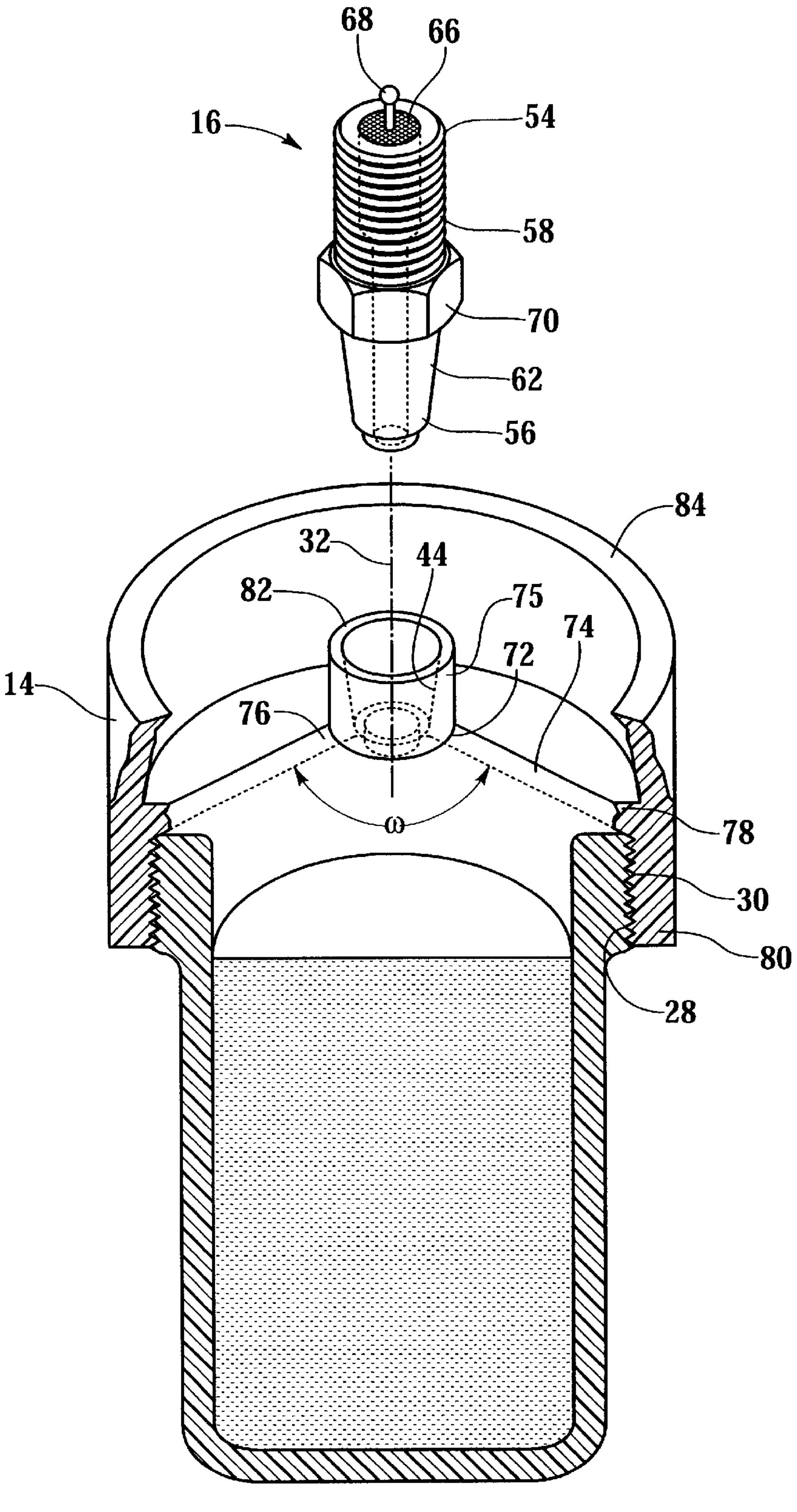
FIG. 5 is a perspective partial sectional view of the fluid supply assembly of the present invention.

Referrng to FIGS. 1, 2 and 5, a friction fit fluid supply assembly 10, 10*b* for a fluid applicator 2, is shown. The friction fit supply assembly 10, 10*b* includes a cover-connector 14, 14*b* for covering and connecting a fluid container 12, 12*b* to a conduit, such as adapter 16 or a hollow bore channel 13 in fluid applicator 2. One of the container 12, 12*b* and the conduit has a male frustoconical connecting surface 62, 44*b*, and the other has a threaded connecting surface, such as threads 28 on container 12 or threads 60 at channel 13. The novel cover-connector 14, 14*b* includes a conduit side 17, 17*b* with a conduit connecting region 20, 86, a container side 15, 15*b* with a container connecting region 80, 80*b*, and a passageway between the conduit connecting region and the container connecting region, such as bore 24*b*, wherein one of the connecting regions has a female frustoconical surface 44, 62*b* having an acute frustoconical angle complementary to the male fiustoconical connecting surface 62, 44*b* for frictional connection therebetween, and wherein the other of the connecting regions has a threaded portion 30, 58*b* complementary to the threaded connecting surface 28, 60 for threaded connecting therebetween, whereupon frictional connection between the female frustoconical surface 44, 62*b* and the male frustoconical surface 62, 44*b* and threaded connection between the threaded portion and the threaded connecting surface provides for fluid communication between the container and the conduit.

The friction fit and engagement between cover-connector 14 and either container 12*b* or the conduit, such as adapter 16, provides a strong seal preventing fluid from leaking, and is easy to engage and disengage allowing for easy assembly of fluid supply assembly 10, 10*b*.

In a preferred embodiment, fluid supply assembly 10, 10*b* is for feeding liquid, such as paint, to a liquid applicator, such as a paint sprayer 2; therefore the present invention will be described for a paint sprayer, such as a gravity feed paint sprayer for use in applying paint 1 to coat substrate surfaces. In one embodiment, paint sprayer 2 is used in the automotive refinishing market, such as automobile body shops, for repainting automobiles.

Although fluid supply assembly 10 is described herein for a paint sprayer, it alternatively can be used for supplying other flowable fluids, such as beverages, foods, condiments (such as ketchup), gasoline, petrochemicals and hydrocarbons, water, waterbased solutions, solvent-based solutions, emulsions, and adhesives. The container 12, cover-connector 14 and adapter 16 must be compatible with the fluid being supplied and the fluid should flow from container 12 in a similar manner as paint from a paint container 12.

A paint sprayer 2 is shown in FIG. 1 and includes a body 3, a nozzle assembly 4 secured to a front end 5 of body 3, and a handle 6 depending from a rear end 7 of body 3. A trigger 8 is pivotally secured to body 3 for the manual actuation of sprayer 2. A top mounted, gravity-feed paint container 12 is mounted to body 3 via cover-connector 14 and adapter 16 near front end 5 for feeding paint to nozzle assembly 4. An air connector 9 is connected to an air hose (not shown) for the delivery of pressurized air to nozzle assembly 4, wherein the delivery of pressurized air is controlled by trigger 8.

Compressed air from air connector 9 is delivered through an internal passage (not shown) to nozzle assembly 4 and the compressed air acts to atomize paint and deliver it through nozzle assembly 4 to spray paint 1 about a spray axis 11. Paint 1 is delivered to nozzle assembly 4 via gravity from paint container 12. The level of paint 1 in paint container 12 must be higher than the sprayer connection channel 13, or else paint 1 will not feed via gravity to the nozzle assembly 4, a condition known as starvation.

FIGS. 1–5 show a first embodiment of a paint supply assembly 10 of the present invention. In the first embodiment, container 12 includes a cover-connector 14 for covering container 12 and connecting it to the conduit, wherein the conduit can be a tapered hollow bore adapter 16 for connecting cover-connector 14 to sprayer 2. Cover-connector 14 shown in FIG. 2 includes a conduit connecting region 20 comprising a fitting 34 at conduit side 17 and a container connecting region 80 at container side 15. Conduit connecting region 20 includes a female frustoconical surface 44 for engaging with a complementary male frustoconical connecting surface 62 of adapter 16. Frustoconical female surface 44 is angled radially outwardly at an acute angle from a cover axis 32 so that female frustoconical surface 44 of fitting 34 is complementary to tapered adapter 16, providing for frictional connection therebetween. When cover-connector 14 is engaged with container 12 and when fitting 34 is engaged with adapter 16, there is fluid communication between fluid container 12 and adapter 16.

Container 12 includes an interior 18 for holding paint 1 and can be generally cylindrical in shape with an outlet end 26 for engaging with cover-connector 14, such as with threading 28 on container 12 engageable with threading 30 on cover-connector 14. Container 12 can have an interior volume of between about 8 fluid ounces and about 2.5 gallons, preferably between about 16 fluid ounces and about 2 liters, still more preferably about 1 liter. A one liter generally cylindrical container 12 has a length of about 4 inches and a diameter of about 6 inches. However, container 12 can have different proportions or geometry. Preferably, the size and shape of container 12 is conducive to the automobile refinishing industry so that sprayer 2 and paint container 12 are not unwieldy or overly heavy for an operator to handle.

Figure 4:
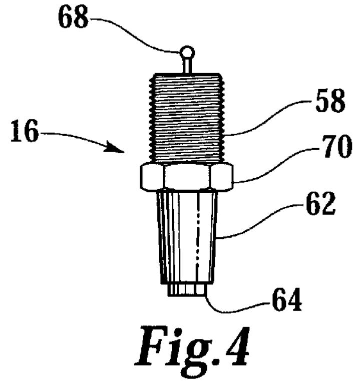
FIG. 4 is a side elevation view of an adapter of the fluid supply assembly of the present invention.

Container 12 can be an unlined paint cup, as shown in FIG. 4, or container 12 can be lined (not shown) as disclosed in the commonly assigned, co-pending patent application Ser. No. 10/458,478 filed contemporaneously herewith, the disclosure of which is incorporated herein by reference.

Preferably, container 12 is made from a translucent material so that the level of paint 1 can be seen through container 12. Both container 12 and cover-connector 14 should also be relatively durable and resistant to collapsing, be made from a relatively inexpensive material and be inexpensive to manufacture so that container 12 and cover-connector 14 can be disposable if desired, and be made from a material that is substantially unreactive to the fluid being delivered to sprayer 2. In one embodiment, container 12 and cover-connector 14 are made from a molded plastic, such as polyethylene or polypropylene. In a preferred embodiment, container 12 and cover-connector 14 are molded from low-density polyethylene. Container 12 can be molded by any of several methods including injection blow molding, injection molding, rotational molding, suction molding, or extrusion molding. Injection blow molding is preferred because it is an inexpensive process. Cover-connector 14 also can be made by several molding methods, but preferably is made by injection molding because of its unique geometry, described below.

Turning to FIGS. 2 and 5, in a preferred embodiment, the interior of cover-connector 14 is shaped generally in the form of an hourglass having a waist 72, a first lobe 74 extending from adapter side 17 outwardly at an obtuse angle from waist 72 to cover and engage with container 12, and a second lobe 75 extending outwardly at an acute angle from waist 72 to frictionally engage generally complementary male tapered hollow bore adapter 16 for use with gravity-feed paint sprayer 2, wherein first lobe 74 and second lobe 75 are preferably generally coaxial with one another.

In one embodiment, first lobe 74 forms the main part of cover-connector 14 and is generally frustoconical in shape having a cover axis 32, wherein first lobe 74 extends from a vertex region 76 to an edge 78 at an obtuse generally frustoconical angle ù facing toward container 12, see FIG. 2. A container connecting region 80 adjoins first lobe 74 at edge 78 on container side 15 and extends toward container 12. Container connecting region 80 can include threads 30 for engaging with threading 28 on container 12, wherein threads 30 are generally normal to cover axis 32.

Second lobe 75 comprises an adapter connection region such as female generally frustoconical fitting 34 and is integrally connected to first lobe 74 of cover-connector 14 at vertex region 76. Female generally frustoconical fitting 34 extends from cover-connector 14 generally axially opposite from container connecting region 80 for receiving male frustoconical connecting surface 62 of adapter 16. Female fitting 34 is angled to open axially and radially outwardly at a predetermined angle á from cover axis 32 to a distal fitting end 82 generally defining a plane normal to cover axis 32. Female fitting 34 is generally complementary to male adapter 16, providing for frictional engagement between cover-connector 14 and adapter.

A passageway is provided between container connecting region 80 and fitting 34 of the adapter connecting region. In one embodiment, the passageway is formed by fitting 34 and frustoconical first lobe 74, wherein paint can flow from container 12, through container connecting region 80, past first lobe 74, through fitting 34 and into adapter 16. The passageway can comprise a hole in cover-connector 14, a passageway already formed between fitting 34 and container connecting region 80, or a passageway that has to be formed between fitting 34 and container connecting region 80, such as a perforable membrane 50 that is broken by adapter 16, described below, to form the passageway.

In one embodiment, cover-connector 14 includes a generally cylindrical support wall 36 extending from edge 78 to a distal wall end 84, wherein distal wall end 84 is in the same plane as distal fitting end 82. Distal wall end 84 should extend at least to the plane of distal fitting end 82, or farther, so that a paint shaker (not shown) can be used to agitate container 12 to mix paint 1 without deforming or damaging fitting 34. Because distal wall end 84 extends to the plane of distal fitting end 82, the forces exerted are distributed to fitting 34 and support wall 36, thereby providing greater structural integrity and resistance against breaking or rupture of fluid supply assembly 10 and its parts.

In one embodiment, container 12 has a diameter of between about 4 inches and about 8 inches, preferably about 6 inches, and first lobe 74 extends from vertex region 76 to edge 78 from between about 2 inches to about 5 inches, preferably about 2½ inches. The obtuse angle ù of first lobe 74 may be between about 100° and about 150°, preferably about 120°. The preferred frustoconical shape of first lobe 74 helps to provide structural strength sufficient to withstand engagement with a friction-fitted component when an operator inserts and pushes adapter 16 into fitting 34. The orientation of first lobe 74, wherein obtuse angle ù opens toward container 12 is preferred because it helps to funnel paint into the passageway and thence to the conduit and applicator.

Frustoconical female surface 44 is angled from cover axis 32 at a predetermined angle acute angle á that may be between about 1° and about 7°, preferably between about 2° and about 5°, still more preferably about 3°. Angle á should be small enough to provide for a strong frictional force between male frustoconical connecting surface 62 and female frustoconical surface 44, but should be large enough to allow for the insertion of male frustoconical connecting surface 62 into fitting 34 without difficulty.

The length of fitting 34 from vertex region 76 to distal fitting end 82 should be long enough to provide sufficient friction between fitting 34 and male frustoconical connecting surface 62 of adapter 16. In one embodiment, the length of fitting 34 is between about ½ inch and about 3 inches, preferably between about ¾ inch and about 1½ inches, still more preferably about 1 inch. The inner diameter of fitting 34 at distal fitting end 82 should be large enough to easily receive male frustoconical connecting surface 62 to provide for easy engagement between cover-conmector 14 and adapter 16. In one embodiment, the inner diameter of fitting 34 at distal fitting end 82 is between about ½ inch and about 1 inch, preferably about ¾ inch.

The geometry of cover-connector 14 should be chosen so that waist 72, first lobe 74, second lobe 75, the engagements between fitting 34 of second lobe 75 and adapter 16 and between container connecting region 80 and container 12 are of a strength sufficient to hold container 12 and the paint 1 it contains in an operative position so that cover-connector 14 does not break during operation due to stress from container 12 and paint 1. For example, waist 72 can be reinforced by making second lobe 74 thicker at waist 72, as best seen in FIG. 5, to ensure that fitting 34 is strong enough to support container 12 and its contents.

Complementary generally fustoconical connecting surfaces 44 and 62 allow for easy engagement and disengagement of adapter 16 and cover-connector 14 simply by rotating one with respect to the other slightly, to frictionally lock or unlock adapter 16 and cover-connector 14.

In one embodiment, fitting 34 includes a perforable membrane 50 across the passageway at waist 72 for keeping container 12 closed until use. Preferably, membrane 50 is radially inside of fitting 34 sealing container until membrane 50 is broken by adapter 16, shown in FIG. 3.

Continuing with FIGS. 2 and 4, cover-connector 14 frictionally connects with a conduit into paint sprayer 2. In a preferred embodiment, the conduit is an adapter 16 for connecting between paint sprayer 2 and cover-connector 14. Adapter 16 is preferably generally cylindrical in shape, including an adapter axis 52, a first end 54 engageable with sprayer 2, shown in FIG. 1, a second end 56, and a hollow bore 24 between first end 54 and second end 56. Adapter 16 includes a male frustoconical connecting surface 62 at the inlet into bore 24 to complement tapered fitting 34 so that adapter connecting region 20 and male frustoconical connecting region 62 can be frictionally engaged to lock adapter 16 and fitting 34 together.

In one embodiment, best seen in FIG. 1, first end 54 of adapter 16 includes threading 58 for engaging with the threading 60 of a sprayer connection channel 13. Preferably, threading 58 is of a typical size and pitch for paint sprayers so that fluid supply assembly 10 can be used with any of several sprayers. In one embodiment, the outside diameter of threading 58 is between about ½ inch and about 1 inch, preferably about ¾ inch.

First end 54 of adapter can engage with sprayer 2 by means other than a threaded connection, including a tapered connection (not shown), a bayonet connection (not shown), a snap connection (not shown), or by first end 54 being integral with sprayer 2 so that the adapter 16 is a feed conduit into sprayer 2.

Male frustoconical connecting surface 62 forms an acute angle â with respect to adapter axis 52. In one embodiment, angle â is between about 1° and about 7°, preferably between about 2° and about 5°, still more preferably about 3° to form a self-locking taper. In a preferred embodiment, the angle â is approximately equal to the angle á of female frustoconical surface 44 so that male frustoconical connecting surface 62 complements female frustoconical surface 44 allowing for locking frictional engagement between adapter 16 and cover-connector 14. As with angle á, angle â should be small enough to provide for tight frictional engagement, but should be large enough to allow for easy insertion of male frustoconical connecting region 62 into fitting 34.

Complementary female frustoconical surface 44 of cover-connector 14 and male frustoconical connecting surface 62 of adapter 16 stay engaged with each other due to frictional forces. For example, for the embodiment shown in FIGS. 2 and 3, after adapter 16 is inserted into fitting 34, male frustoconical connecting surface 62 engages with female frustoconical surface 44. As adapter 16 is continued to be pushed and rotated by an operator into fitting 34, the male frustoconical connecting surface 62 begins to slightly deform the female frustoconical surface 44 of fitting 34, creating a strong frictional force between adapter 16 and cover-connector 14. This strong frictional force effectively seals adapter 16 into tapered outlet 20 to prevent leaking of paint.

The male frustoconical connecting surface 62 and complementary female frustoconical surface 44 also allow for releasable engagement between adapter 16 and fitting 34. In order to release adapter 16 from engagement with cover-connector 14, an operator simply has to rotate adapter 16 and cover-connector 14, one with respect to the other, in the opposite rotational direction as when the operator frictionally engaged frustoconical surface 44 and 62, as described below.

Figure 3:
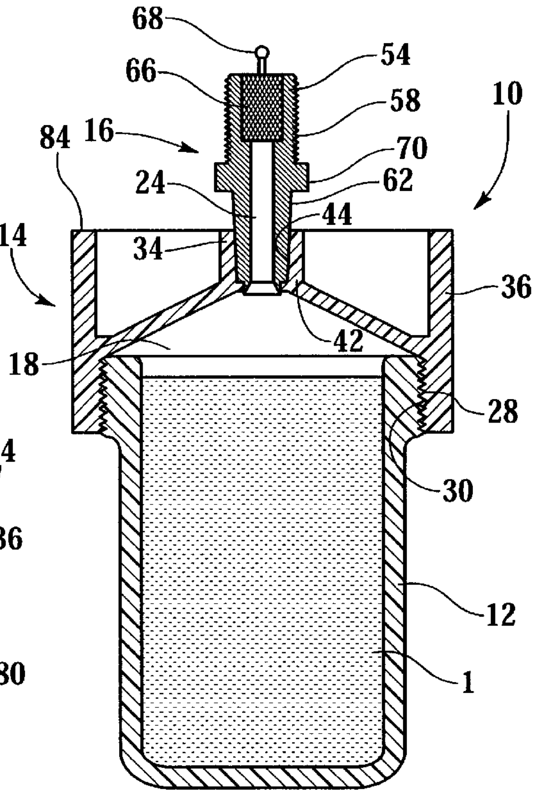
FIG. 3 is an assembled side sectional view of the fluid supply assembly of the present invention.

In one embodiment, adapter 16 includes a sharp edge or perforator 64 at second end 56 which acts as a bayonet for breaking perforable membrane 50 when adapter 16 is engaged with tapered outlet 20, as shown in FIG. 3.

Adapter 16 also can include a filter 66 in bore 24 to filter impurities, such as dust or other particulates, from flowing into sprayer 2 so that the impurities will not be applied to the surface being painted. Filter 66 is preferably removable, such as with a small handle 68, so that filter 66 may be replaced if it becomes worn or soiled. An example of a filter that can be used is the model KGP-5-K5 filter manufactured by ITW DeVilbiss Automotive Refinishing.

Turning to FIG. 5, adapter 16 also can include a tool engaging portion 70, which can have a cross-sectional shape adapted to be engaged by a tool to aid in rotation of adapter 16, such as a wrench (not shown) to install or uninstall adapter 16 from engagement with sprayer 2. Tool engaging potion 70 can have a cross-sectional shape such as a hexagonal shape for easy engagement with a tool.

Adapter 16 preferably is manufactured from a metal or other durable material that is substantially unreactive and resistant to corrosion by the fluid passing through adapter 16. Preferably, adapter 16 is made from a metal so that adapter 16 will be durable and can be reused multiple times without needed to be replaced. In one embodiment, adapter 16 is made from aluminum, but it can be made from other metals or alloys including steel, zinc or powder metals. A metal adapter 16 can be made by several methods include machining, die casting, investment casting, precision casting or powdered metallurgical methods. Alternatively, adapter can be made from a plastic, such as polyethylene or polypropylene, or other engineered plastics by injection molding or other methods.

Although adapter 16 is shown as being one generally cylindrical piece, it is envisioned that adapter 16 can have other configurations, such as an adjustable adapter that allows the orientation of container 12 to be changed to ensure that paint 1 will flow into sprayer 2. An example of an adjustable adapter is disclosed in the commonly assigned, co-pending patent application Ser. No. 10/458,548 filed contemporaneously herewith, the disclosure of which is incorporated herein by reference.

Figure 6:
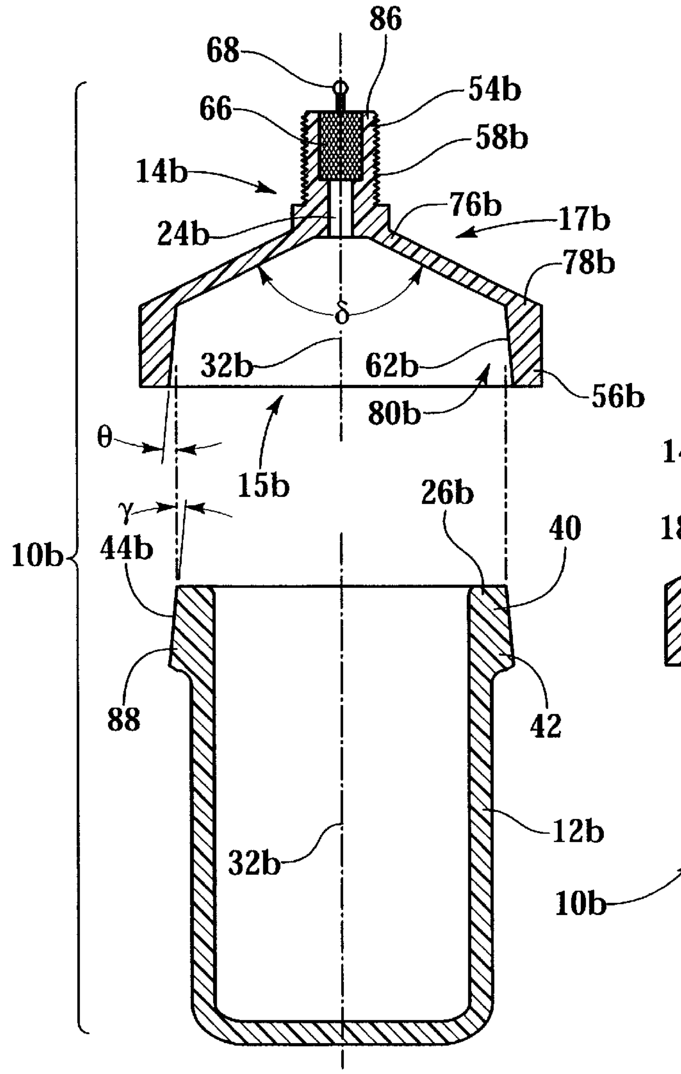
FIG. 6 is an exploded side sectional view of a second embodiment of a fluid supply assembly according to the present invention.
Figure 7:
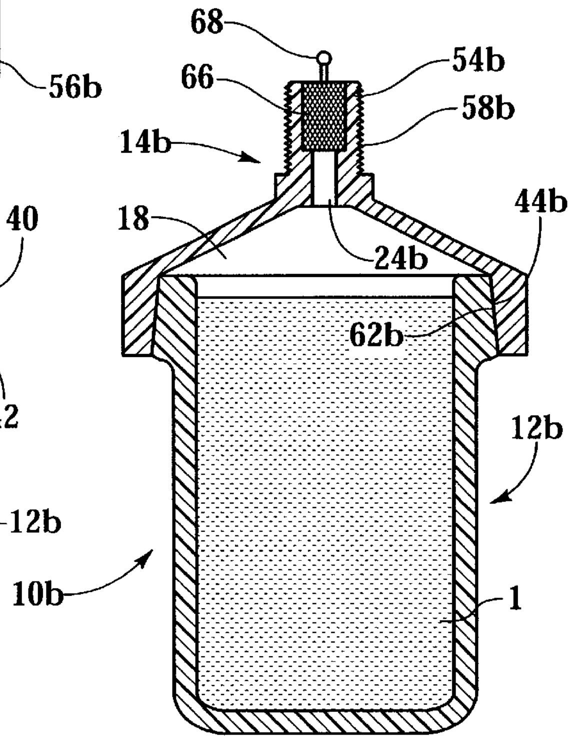
FIG. 7 is an assembled side sectional view of the second embodiment of the fluid supply assembly of the present invention.

Turning to FIGS. 6 and 7, a second embodiment of the fluid supply assembly **10*b* of the present invention is shown. In the second embodiment, fluid supply assembly 10*b* does not include an adapter between the cover-connector and the sprayer, and cover-connector 14*b*** engages directly with the sprayer conduit.

Container **12*b* includes a cover connecting region 88 that is tapered toward outlet end 26*b* so that the wall of container 12*b* is thinner at a top end 40 than at a bottom end 42, forming a tapered surface 44*b*. In one embodiment, cover connecting region 88 is on a male frustoconical connecting surface 44*b*, forming a male frustoconical connecting surface 44*b* that converges toward outlet end 26*b*, wherein male frustoconical connecting surface 44*b* forms an acute predetermined angle ã with respect to container axis 32*b*. In one embodiment, angle ã is between about 1° and about 7°, preferably between about 2° and about 5°, still more preferably about 3° to form a self-locking tapered container outlet. In a preferred embodiment, male frustoconical connecting surface 44*b* complements a generally frustoconical female surface 62*b* on cover-connector 14*b***, described below.

Continuing with FIG. 6, cover-connector **14*b* of the second embodiment forms a mushrooming shape so that cover-connector 14*b* acts to both cover container 12*b* and to connect container 12*b* to a conduit of a paint sprayer. Cover-connector 14*b* includes a conduit side 17*b* with a conduit connecting region 86 having threads 58 for engaging a conduit and a container side 15*b* having a container connecting region 80*b* with a female frustoconical surface 62*b* for frictionally connecting to male frustoconical connecting surface 44*b*. Cover 14*b* also includes a bore or passageway 24*b* between conduit connecting region 86 and container connecting region 80*b***.

Continuing with FIG. 6, in one embodiment, cover-connector **14*b* is generally frustoconical in shape having an axis 32*b*, wherein cover-connector 14*b* extends from a vertex region 76*b* to an edge 78*b* at an obtuse generally frustoconical angle ä facing toward container 12*b*. A conduit connecting region 86 is included at first end 54*b*. In one embodiment, conduit connecting region 86 includes threads 58*b* for engaging with threading on the sprayer, wherein threads 58*b* are preferably generally normal to adapter axis 32*b*. Cover-connector 14*b* also includes a tapered container connecting region 80*b* that complements cover connecting region 88 for engaging with container 12*b*. Container connecting region 80***b* adjoins cover-connector 14*b* at edge 78*b* and extends generally toward container 12*b*. Container connecting region 80*b* includes a female frustoconical surface 62*b* that compliments male frustoconical connecting surface 44*b* of container 12*b*, wherein female frustoconical surface 62*b* is angled from adapter axis 32*b* at an acute predetermined angle è so that female flustoconical surface 62*b* is complementary to male frustoconical connecting surface 44*b* of container 12*b* to provide for frictional engagement therebetween.

In one embodiment, angle è is between about 1° and about 7°, preferably between about 2° and about 5°, still more preferably about 3°. In a preferred embodiment, the angle è of adapter female frustoconical surface 62*b* is approximately equal to the predetermined angle ã of male frustoconical connecting surface 44*b* of container 12*b* so that female frustoconical surface 62*b* complements male frustoconical connecting surface 44*b* allowing for locking frictional engagement between cover-connector 14*b* and container 12*b*.

The method that an operator uses to connect a fluid container 12 to a fluid applicator 2 includes the steps of providing a conduit, such as hollow bore adapter 16, in fluid communication with fluid applicator 2, providing a fluid container 12, wherein one of the container 12 and the conduit include a male frustoconical connecting surface 62 and the other of the container 12 and the conduit includes a threaded connecting surface 28, providing a cover-connector 14 having a conduit side 17 with a conduit connecting region 20, a container side 15 with a container connecting region 80, and a passageway between the connecting regions 20, 80, wherein one of the connecting regions 20, 80 has a female frustoconical surface 44 having an acute frustoconical angle complementary to male frustoconical connecting surface 62, and wherein the other of the connecting regions 20, 80 has a threaded portion 30 complementary to the threaded connecting surface 28, threading connecting threaded portion 30 with threaded connecting surface 28, and engaging male frustoconical connecting surface 62 with female frustoconical surface 44 and rotating male frustoconical connecting surface 62 and female frustoconical surface 44 with respect to one another for frictional connection therebetween.

An operator uses fluid supply assembly 10 by loading a desired color of paint 1 and any desired tinting additives or solvents into a container. If container 12 of FIGS. 1–5 is used, cover-connector 14 is engaged with container 12, such as by engaging container threading 28 with cover threading 30. Container and cover-connector 14 can then be placed in a paint shaker (not shown) to ensure that paint 1 and any tinting additives or solvents are thoroughly and evenly mixed. Perforable membrane 50 in cover-connector 14 prevents paint 1 from spilling out of container 12. If container 12*b* of FIGS. 6 and 7 is used, container 12*b* is engaged with cover-connector 14*b*, described below, after loading paint.

In FIGS. 1–5, engaging adapter 16 with container 12 includes inserting male frustoconical connecting surface 62 into fitting 34 so that male frustoconical connecting surface 62 of adapter 16 is engaged with female frustoconical surface 44 of fitting 34. While adapter 16 is pushed into fitting 34, perforator 64 cuts through membrane 50, forming the passageway so that adapter bore 24 will be in fluid communication with interior 18 of container 12. The operator continues pushing adapter 16 in an axial direction into fitting 34 until adapter 16 stops, at which point the operator continues to push in an axial direction while rotating adapter 16 with respect to container 12 and cover-connector 14, or vice versa, until male frustoconical connecting surface 62 of adapter 16 is forcefully and rotationally engaged with female frustoconical surface 44 of receptacle. In one method, the operator rotates adapter 16 or container 12 between about 5° and about 90°, preferably between about 10° and about 15° with respect to the other. As adapter 16 is rotated, male frustoconical connecting surface 62 slightly deforms female frustoconical surface 44 to create a tight frictional seal between adapter 16 and container 12. Adapter male frustoconical connecting surface 62 and female frustoconical surface 44 are not threads, so it does not matter which direction adapter 16 and container 12 are rotated. Either direction will cause male frustoconical connecting surface 62 and female frustoconical surface 44 to frictionally lock against each other to form a tight frictional seal.

In the embodiment of FIGS. 6 and 7, after container 12*b* is loaded with paint 1, male frustoconical connecting surface 44*b* at outlet end 26*b* of container 12*b* is inserted into female frustoconical surface 62*b* of cover-connector 14*b* and container 12*b* and cover-connector 14*b* are rotated with respect to one another, in order to frictionally engage and lock male frustoconical connecting surface 44*b* with female frustoconical surface 62*b*. As with FIGS. 1–5 described above, it does not matter which direction the operator rotates container 12*b* or cover-connector 14*b* because male frustoconical connecting surface 44*b* and female frustoconical surface 62*b* are not threads.

The operator then engages first end 54 of adapter with sprayer 2, such as with adapter threading 58 and connector channel threading 60. Sprayer 2 is turned upside down, generally opposite to what is shown in FIG. 1, so that paint 1 will not spill out of container through adapter 16, and first end 54 is inserted into connection channel 13 of sprayer 2. Either fluid supply assembly 10 or sprayer 2 is rotated so that adapter threading 58 engages with connector channel threading 60. Sprayer 2 can now be used to apply paint 1 to a surface.

The operator can change the order of the steps to suit their own needs and preferences. For example, the operator could engage adapter 16 with sprayer 2 first, then engage male frustoconical connecting surface 62 of adapter 16 with female frustoconical surface 44 of fitting 34, then engage cover-connector 14 with container 12. All connections are to be made so that paint 1 will flow, without leaking, from container 12, through adapter 16, and into sprayer 2.

After the operator is finished spraying paint, sprayer 2 and container 12 are again turned upside down, generally opposite to what is shown in FIG. 1, and cover-connector 14 and container 12 are disengaged from adapter 16. In order to disengage tapered adapter 16 from cover-connector 14, the operator simply rotates one or the other in the opposite direction as when the operator engaged adapter 16 and container 12. For example, if the operator rotated adapter 16 in a clockwise direction relative to container 12 for engagement, the operator would rotate adapter 16 in a counterclockwise direction relative to container 12 for disengagement. Disengaging container 12*b* from cover-connector 14*b* of FIGS. 6 and 7 is accomplished in a similar manner.

The present invention provides a tight and strong seal for a fluid supply assembly between a conduit and a container via a cover-connector that is easy to engage and disengage. A cover-connector for covering and connecting a fluid supply container to a conduit is provided, wherein one of the container and the conduit has a male frustoconical connecting surface and the other one of said container and said conduit has a threaded connecting surface. The novel cover-connector comprises a conduit side with a conduit connecting region, a container side with a container connecting region, and a passageway between the connecting regions, wherein one of the connecting regions has a female frustoconical surface having an acute frustoconical angle complementary to the male frustoconical connecting surface for frictional connection therebetween, and wherein the other of the connecting regions has a threaded portion complementary to the threaded connecting surface for threaded connecting therebetween.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments or methods, but by all embodiments and methods within the scope and spirit of the invention.

What is claimed is:

1. A cover-connector for covering a fluid supply container and connecting said container to a conduit, wherein one of said container and said conduit has a male frustoconical connecting surface and the other of which has a threaded connecting surface, said cover-connector comprising a conduit side with a conduit connecting region, a container side with a container connecting region, and a passageway between said connecting regions, wherein one of said connecting regions has a female fitting with a female frustoconical surface having an acute frustoconical angle complementary to said male frustoconical connecting surface for a friction fit connection therebetween, and wherein the other one of said connecting regions has a threaded portion complementary to said threaded connecting surface for threaded connection therebetween.

2. A cover-connector for covering a fluid supply container and connecting said container to a conduit, wherein one of said container and said conduit has a male frustoconical connecting surface and the other of which has a threaded connecting surface, said cover-connector comprising a conduit side with a conduit connecting region, a container side with a container connecting regon, and a passageway between said connecting regions, wherein one of said connecting regions has a female frustoconical surface having an acute frustoconical angle complementary to said male frustoconical connecting surface for frictional connection therebetween, and wherein the other one of said connecting regions has a threaded portion complementary to said threaded connecting surface for threaded connection therebetween, wherein said cover-connector is generally frustoconical in shape extending from a vertex region to an edge, said cover-connector having an obtuse frustoconical angle facing toward said container when covering same, wherein said conduit connecting region is integral with said cover-connector at said vertex region and wherein said container connecting region is integral with said cover-connector at said edge.

3. A cover-connector according to claim 1, wherein said conduit is in fluid communication with a fluid applicator.

4. A cover-connector according to claim 1, wherein said conduit includes said male frustoconical connecting surface, and wherein said conduit connecting region includes said female frustoconical surface.

5. A cover-connector for covering a fluid supply container and connecting said container to a conduit, wherein one of said container and said conduit has a male frustoconical connecting surface and the other of which has a threaded connecting surface, said cover-connector comprising a conduit side with a conduit connecting region, a container side with a container connecting region, and a passageway between said connecting regions, wherein one of said connecting regions has a female frustoconical surface having an acute frustoconical angle complementary to said male frustoconical connecting surface for frictional connection therebetween, and wherein the other one of said connecting regions has a threaded portion complementary to said threaded connecting surface for threaded connection therebetween, further comprising a membrane across said passageway, said membrane being perforable by a perforator on said conduit, whereupon frictional connection between said female frustoconical surface and said male frustoconical surface and threaded connection between said threaded portion and said threaded connecting surface provides for perforation of said membrane and fluid communication between said container and said conduit.

6. A cover-connector according to claim 1, wherein said container includes said male frustoconical connecting surface, and wherein said container connecting region includes said female frustoconical surface.

7. A cover-connector according to claim 1, further comprising a filter in said conduit.

8. A cover-connector for covering and connecting a paint container to a male tapered hollow bore adapter for use with a paint sprayer, comprising:

- a generally frustoconical cover having an axis and extending from a vertex region to an edge at an obtuse frustoconical angle facing toward said paint container when covering same;
- a container connecting region with threads for engaging said paint container, said container connecting region adjoining said cover edge and extending toward said paint container when covering same, said threads being normal to said axis;
- a generally frustoconical female fitting integrally connected to said cover at said vertex region, said fitting extending from said cover generally axially opposite from said container connecting region for receiving said male tapered hollow bore adapter, said fitting being angled to open axially and radially outwardly at an acute angle from said axis to a distal fitting end generally defining a plane normal to said axis, said fitting being complementary to said adapter while providing for frictional engagement therebetween;
- a passageway between said container connecting region and said fitting; and
- a generally cylindrical support wall extending axially from said cover edge to a distal wall end in said plane;
- whereupon engagement of said threads with said paint container and said fitting with said adapter provides fluid communication between said paint container and said adapter.

9. A fluid supply assembly comprising a fluid container and a conduit, wherein one of said container and said conduit has a male frustoconical connecting surface and the other of which has a threaded connecting surface, and a cover-connector for covering said container and connecting said container to said conduit, said cover-connector including a conduit side with a conduit connecting region, a container side with a container connecting region, and a passageway between said connecting regions, wherein one of said connecting regions has a female fitting with a female frustoconical surface having an acute frustoconical angle complementary to said male frustoconical connecting surface for a friction fit connection therebetween, and wherein the other one of said connecting regions has a threaded portion complementary to said threaded connecting surface for threaded connection therebetween.

10. A method of connecting a fluid container to a fluid applicator comprising the steps of:

providing a conduit in fluid communication with said fluid applicator;

providing said container;

wherein one of said container and said conduit has a male frustoconical connecting surface and the other of which has a threaded connecting surface;

providing a cover-connector having a conduit side with a conduit connecting region, a container side with a container connecting region, and a passageway between said connecting regions, wherein one of said connecting regions has a female fitting with a female frustoconical surface having an acute frustoconical angle complementary to said male frustoconical connecting surface, and wherein the other of said connecting regions has a threaded portion complementary to said threaded connecting surface;

threadingly connecting said threaded portion and said threaded connecting surface; and engaging said male frustoconical connecting surface with said female frustoconical surface and rotating said male frustoconical connecting surface and said female frustoconical surface with respect to one another for a friction fit connection therebetween.

* * * * *